(12) United States Patent
Abma et al.

(10) Patent No.: US 9,841,520 B2
(45) Date of Patent: Dec. 12, 2017

(54) SPATIAL SAMPLING IMPROVEMENTS AND THE FORMATION OF ARRAYS USING POPCORN AND SIMULTANEOUS SOURCE ACQUISITION

(71) Applicants: Raymond Lee Abma, Houston, TX (US); Allan Ross, Houston, TX (US)

(72) Inventors: Raymond Lee Abma, Houston, TX (US); Allan Ross, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 138 days.

(21) Appl. No.: 14/657,525

(22) Filed: Mar. 13, 2015

(65) Prior Publication Data

US 2015/0260867 A1    Sep. 17, 2015

Related U.S. Application Data

(60) Provisional application No. 61/953,138, filed on Mar. 14, 2014.

(51) Int. Cl.
*G01V 1/38* (2006.01)
*G01V 1/28* (2006.01)
*G01V 1/00* (2006.01)

(52) U.S. Cl.
CPC ............ *G01V 1/3808* (2013.01); *G01V 1/005* (2013.01); *G01V 1/28* (2013.01); *G01V 2210/127* (2013.01); *G01V 2210/1212* (2013.01)

(58) Field of Classification Search
CPC .......... G01V 1/05; G01V 1/3808; G01V 1/28; G01V 2210/127; G01V 2210/1212
USPC .................................................. 367/7, 23, 15
See application file for complete search history.

(56) References Cited

U.S. PATENT DOCUMENTS

| | | |
|---|---|---|
| 4,357,689 A | 11/1982 | Ruehle |
| 5,924,049 A | 7/1999 | Beasley et al. |
| 8,345,510 B2 | 1/2013 | Hegna et al. |
| 2012/0014212 A1 | 1/2012 | Eick et al. |
| 2012/0033525 A1 | 2/2012 | Abma et al. |
| 2012/0147701 A1 | 6/2012 | Ross et al. |
| 2016/0109600 A1* | 4/2016 | Mensch ............... G01V 1/3817 367/20 |

OTHER PUBLICATIONS

Ziolkowski, A.M., 1984, The Delft Air Gun Experiment, First Break, Jun. 1984, 9-18.
PCT Search Report dated Oct. 7, 2015.
(Continued)

*Primary Examiner* — Daniel L Murphy
(74) *Attorney, Agent, or Firm* — K. KaRan Reed (57) ABSTRACT

So-called "Popcorn shooting", and especially continuous Popcorn shooting, combined with simultaneous source shooting allows considerable flexibility in producing high-resolution data and in creating source arrays. Using a combination of simultaneous source de-blending and Popcorn reconstruction it is possible to construct using post acquisition processing arrays of any desired length by constructing a popcorn pattern that takes into account the vessel speed and physical arrangement of guns behind the towing vessel.

18 Claims, 6 Drawing Sheets

(56) References Cited

OTHER PUBLICATIONS

Ray Abma et al: "Popcorn shooting: Sparse inversion and the distribution of airgun array energy over time", SEG Technical Program Expanded Abstracts 2013, Aug. 19, 2013, pp. 31-35, XP055194149.

R L Abma et al: "High Quality Separation of Simultaneous Sources by Sparse Inversion" 72nd EAGE Conference Exhibition, Extenden Abstracts, Jun. 1, 2010, XP055216636.

* cited by examiner

SPATIAL SAMPLING IMPROVEMENTS AND THE FORMATION OF ARRAYS USING POPCORN AND SIMULTANEOUS SOURCE ACQUISITION

CROSS REFERENCE TO RELATED APPLICATIONS

This application claims the benefit of U.S. Patent Application Ser. No. 61/953,138 filed on Mar. 14, 2014, and entitled "Spatial Sampling Improvements and the Formation of Arrays Using Popcorn and Simultaneous Source Acquisition," which is hereby incorporated herein by reference in its entirety.

TECHNICAL FIELD

This disclosure relates to the general subject of seismic surveillance and, in particular, to methods for acquiring seismic and other signals that are representative of the subsurface for purposes of seismic exploration and/or surveillance.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths are 5-16 seconds, which corresponds to 2500-8000 samples at a 2-millisecond interval. Conventionally each trace records a source activation so there is one trace for each live source location-receiver activation. Note that, for purposes of the instant disclosure, the term "source" should be understood to mean either a single seismic signal device or a collection of seismic signal devices (which might be clustered or spaced apart) that are to be activated simultaneously or both. It should be clear from the context in which is intended. In a typical 2-D survey, there will usually be many source activation at different locations which can result in several tens of thousands of traces, whereas in a 3-D survey the number of individual traces may run into the multiple millions of traces.

In seismic acquisition a marine source array, usually an array of air guns, is composed of many single units that are towed behind a vessel that travels over the survey area. These units (e.g., air guns, water guns, sparkers, boomers, chip systems, water sirens, etc.) are typically hung in a line under a sausage buoy to allow them to be towed in a streamlined fashion. It is typical in deep water seismic surveying to use 6 to 8 guns under a single buoy. This configuration of seismic sources is conventionally referred to as a sub-array. For purposes of the instant disclosure, the term "array" will be understood to refer to the totality of sources that are to be utilized in a seismic survey, in the marine case whether towed by one boat or two or more. A subarray (which might consist of one or more sources) will be understood to be a subset of the sources that are to be activated simultaneously.

If more guns are needed to achieve the desired signal properties, additional subarrays are typically used to prevent the sausage buoy and seismic gun array from becoming too long to fit in the available space on deck and to prevent it from becoming excessively directional and excessively long. Excessively long and directional arrays have undesirable properties. For example, if the number of guns necessitates an array that is several tens of meters long, not only would the buoy and array be too long to fit onto a typical seismic vessel, but the signal emitted by the array would be received by the seismic receivers with a great deal of differential normal moveout. That is, because of the different locations within the subarray the signal path and travel time for each source varies enough such that the difference amounts to a fair fraction of a temporal period. Thus, the higher frequency components will tend to be out of phase and thereby attenuating.

Heretofore, as is well known in the seismic acquisition and processing arts, there has been a need for a system and method that provides a more efficient method of acquiring and processing seismic data that does not suffer from the disadvantages of the prior art. Accordingly, it should now be recognized, as was recognized by the present inventors, that there exists, and has existed for some time, a very real need for a method of seismic data processing that would address and solve the above-described problems.

Before proceeding to a description of the present embodiments, however, it should be noted and remembered that the description which follows, together with the accompanying drawings, should not be construed as limiting the claims to the examples (or embodiments) shown and described. This is so because those skilled in the art will be able to devise other forms of this disclosure within the ambit of the appended claims.

SUMMARY

According to one aspect, there is provided a system and method of marine seismic exploration that allows towed seismic sources to be used more efficiently than has been possible heretofore.

Self-simultaneous sourcing in the marine context is a method of increasing the shot spatial sampling density of a seismic survey without slowing down the speed of the shooting boat. A typical self-simultaneous shooting example might activate the source arrays at half the time interval of that used in a conventional survey. This causes the shot records to overlap each other in time which is generally avoided in seismic acquisition. Thus, for purposes of the instant disclosure, "self-simultaneous source" acquisition will be understood to be a method of seismic data collection where the signals from two or more successive source (array) activations from the same source or nearby sources that materially interfere (i.e., overlap) with each other, where a source or array of sources is "nearby" when sources are towed by the same vessel. Fortunately, though, overlapping shots can then separated during processing according to methods well known to those of ordinary skill in the art (e.g., shot separation by inversion). Some variations of the Popcorn acquisition system and method taught herein may involve self-simultaneous sourcing but that is not a requirement. "Self-simultaneous sourcing" should be understood to refer to instances where the same source (including an array of individual sources) is activated in rapid enough succession that late arriving reflections from a first activation of that source overlap in time and materially interfere with early arriving reflections from one or more subsequent activations of that same or nearby source.

Popcorn shooting is the practice of shooting the individual air guns within an array/subarray over a period of time instead of the conventional practice of simultaneously firing of all the guns in the array. Broadly speaking there are three variations of this approach. The first is Popcorn shooting where a source does not overlap itself. A second variation of Popcorn shooting is self-simultaneous Popcorn in which one or more sources overlap themselves. Finally, in still another variation of Popcorn shooting, the instant system and method may be implemented where one source vessel (or, more generally, more than one survey crew) shoots against another.

An embodiment frees the desired and ideal array length from the physical dimensions of the array. For example, if the Popcorn method (discussed below) is used then each gun can be fired separately in a pattern of N seconds, with the resulting overlapping signals being separated by an inversion method, preferably the Popcorn inversion method. Thus, each single gun can potentially be a point source, regardless of the spatial arrangement of the guns behind the seismic vessel.

Among the many possible embodiments of the teachings presented herein are:
1. An embodiment wherein each gun's signal can be processed individually to increase spatial sampling density.
2. An embodiment wherein each gun can be fired in the same location. That is, the leading gun in the array (i.e., the source that is positioned closest to the towing vessel) can be fired at a particular location and then subsequent sources, further from the vessel, can be fired as they are towed to that same location. Separation of the overlapping shots can then be done using inversion or a similar technique.
3. An embodiment wherein a physically short array can be apparently lengthened if the guns on the array are shot back to front.

The first embodiment above will provide the greatest flexibility since, once the individual gun shots are separated, digital array forming may be used to create any desired array, or the sources may be maintained as separate point sources.

In a second embodiment each gun may be fired at the same surface location by scheduling the firing times appropriately. Alternatively, the firing times could be modified slightly so that an array that is shorter than the actual physical array may be digitally constructed.

A third embodiment allows a short array to be lengthened by scheduling the firing times of the individual guns to be spread out over a distance that is longer than the physical array. Typically this would involve firing the guns from the back of the physical array to the front, but the length of the digitally constructed array would be more strongly affected by the firing time between the first shot in the array, the last shot in the array times, and the vessel speed than the actual location of the air gun within the physical array.

According to an embodiment, there is taught herein a method of seismic exploration above a region of the subsurface of the earth containing structural or stratigraphic features conducive to the presence, migration, or accumulation of hydrocarbons, wherein is provided a seismic array towed proximate to the region of the subsurface of the earth, said seismic array comprising a plurality of marine seismic sources organized into a plurality of subarrays, each of said subarrays having one or more of said marine seismic sources associated therewith, the method comprising: providing a different shooting schedule for each of said plurality of subarrays; recording seismic data as each of said plurality of subarrays is activated according to said provided shooting schedule; choosing a shot point interval; identifying any seismic traces within said recorded seismic data corresponding to said chosen shot point interval; using said any identified seismic traces to reconstruct said recorded seismic data into a plurality of seismic data traces by solving a system of equations represented by $$d = Am,$$

where m is said plurality of seismic data traces, d is said any identified seismic traces, and A, is a set of Popcorn signatures corresponding to said shooting schedule; and, using said plurality of seismic data traces to image at least a portion of the subsurface of the earth.

There is also taught herein a method of seismic exploration above a region of the subsurface of the earth containing structural or stratigraphic features conducive to the presence, migration, or accumulation of hydrocarbons, wherein is provided a marine seismic array towed proximate to the region of the subsurface of the earth, said marine seismic array comprising a plurality of marine seismic sources organized into two or more subarrays, each of said subarrays having one or more of said marine seismic sources associated therewith, the method comprising: towing said marine seismic array to a location proximate to the region of the subsurface of the earth; determining a distance of each of said subarrays to said marine craft; while said marine craft is moving, sequentially activating each of said subarrays in turn according to its said determined distance from said marine craft beginning with a most distant one of said plurality of subarrays; recording seismic data while said each of said subarrays is activated; reconstructing a plurality of seismic traces from said recorded seismic data; and, using said plurality of seismic traces to image at least a portion of the subsurface of the earth.

There is still further taught herein a method of seismic exploration above a region of the subsurface of the earth containing structural or stratigraphic features conducive to the presence, migration, or accumulation of hydrocarbons, wherein is provided a marine seismic array towed proximate to the region of the subsurface of the earth, said marine seismic array comprising a plurality of marine seismic sources organized into two or more subarrays, each of said subarrays having one or more of said marine seismic sources associated therewith, the method comprising: positioning said marine seismic array so that a first one of said plurality of subarrays is proximate to a location above the region of the earth; activating said first one of said plurality of subarrays proximate to said location; after said first one of said plurality of subarrays is activated, towing said marine seismic array until a second one of said plurality of subarrays is proximate to said location; activating said second one of said plurality of subarrays proximate to said location; performing steps (c) and (d) for at least two different ones of said plurality of subarrays; recording seismic data sourced from activation of said first one of said plurality of subarrays and from activation of any of said second ones of said plurality of subarrays activated proximate to said location; reconstructing a plurality of seismic traces from said recorded seismic data; and, using said plurality of seismic traces to image at least a portion of the subsurface of the earth.

There is also taught herein a method of seismic exploration for hydrocarbons within a region of the subsurface of the earth, the method comprising: accessing a plurality of reconstructed seismic traces from a seismic survey collected proximate to the region of the subsurface of the earth according to an acquisition method comprising: towing said marine seismic array to a location proximate to the region of the subsurface of the earth; determining a distance of each of said subarrays to said marine craft; while said marine craft is moving, sequentially activating each of said subarrays in turn according to its said determined distance from said marine craft beginning with a most distant one of said plurality of subarrays; recording seismic data while said each of said subarrays is activated; and, reconstructing a plurality of seismic traces from said recorded seismic data; and, using said plurality of reconstructed seismic traces to image at least a portion of the subsurface of the earth, thereby exploring for hydrocarbons within the region of the subsurface of the earth.

The foregoing has outlined in broad terms the more important features of the teachings herein so that the detailed description that follows may be more clearly understood, and so that the contribution of the instant inventors to the art may be better appreciated. This disclosure and the claims that follow are not to be limited in its application to the details of the construction and to the arrangements of the components set forth in the following description or illustrated in the drawings. Rather, the teachings are capable of other embodiments and of being practiced and carried out in various other ways not specifically enumerated herein. Finally, it should be understood that the phraseology and terminology employed herein are for the purpose of description and should not be regarded as limiting, unless the specification specifically so limits it.

BRIEF DESCRIPTION OF THE DRAWINGS

Other objects and advantages will become apparent upon reading the following detailed description and upon reference to the drawings in which.

DETAILED DESCRIPTION

While the teachings that follow are susceptible of embodiment in many different forms, there is shown in the drawings, and will herein be described hereinafter in detail, some specific embodiments. It should be understood, however, that the present disclosure is to be considered an exemplification of the principles taught herein and is not intended to limit the claims to the specific embodiments or algorithms so described.

Embodiments

According to an embodiment, there is provided a method of marine seismic acquisition that allows more seismic sources to be utilized than would otherwise be possible in a conventional/single sub-array configuration. It should be noted that additional descriptions of some aspects of an embodiment may be obtained by reference to U.S. patent application Ser. No. 13/315,947, US 2012/0147701 A2, the "Popcorn patent application", the disclosure of which is incorporated by reference herein as if fully set out at this point.

Popcorn shooting has many advantages, but one of particular interest for purposes of this disclosure is that it may be used to control or shape the spatial sampling of seismic data. This sampling may be improved with the use of simultaneous source acquisition, or with the use of the combination of simultaneous source acquisition and Popcorn technology. With this improved resolution comes a new flexibility in designing and creating source arrays.

Self-simultaneous sourcing is a method of increasing the shot spatial sampling density of a seismic survey without slowing down the speed of the shooting boat. A typical self-simultaneous shooting example would be shooting at half the time interval of a conventional survey, where each shot is comprised of some number of sources filed simultaneously. This will cause the shot records to overlap each other in time which is generally avoided in seismic acquisition. However, overlapping shots can then separated during subsequent processing according to methods well known to those of ordinary skill in the art (e.g., by using inversion or, more specifically, in some embodiments by sparse inversion).

Popcorn shooting, the practice of shooting individual air guns within an array over a period of time instead of the conventional simultaneous firing of multiple guns, may be considered as an extreme form of self-simultaneous shooting. One application of Popcorn shooting is continuous Popcorn, that is, the continuous firing of air guns while the boat is moving. Processing continuous Popcorn in some embodiments involves choosing a shot point interval, collecting all of the seismic traces that record air gun firings that occurred at surface locations defined by the chosen shot point interval, and separating the collected traces that contain overlapping shots using a combination of Popcorn reconstruction and shot separation by inversion as described in the first shot separation by inversion U.S. Pat. No. 8,559,270, the disclosure of which is incorporated herein by reference as if fully set out at this point.

Note that in the Popcorn processing sequence for continuous Popcorn shooting there may likely be no natural shot point interval. Since source activations in some Popcorn embodiments are continuously (and even randomly) occurring, source activations will not likely be situated at regularly spaced surface locations, as is the case with conventional seismic acquisition. As a consequence, in this embodiment the shot point interval is a processing parameter, which may be varied as needed. For example, the shot point interval may be set to a small value for shallow, high-resolution surveys where the small shot interval is needed. For deeper targets, the shot point interval may be set to a large value to allow more air guns to contribute to each effective shot. The smallest shot point interval may be set to something that is less than a typical interval between air gun firing positions since the shot separation by inversion method can interpolate shots as needed. In each of these cases, seismic traces that record source activations at the chosen locations will be identified, separated from overlapping shots (if needed), and then used in subsequent processing as is described more fully below.

The method above creates shot arrays that are approximately the length of the shot point interval desired. The array length might also be increased by grouping overlapping air gun firings to create the same number of calculated shots with the shots containing individual firings of air guns that are shared between shots.

An alternative to the above method of creating arrays is to separate all the individual air gun firings and then to create arrays from the individual firings. This might be done with simple summations, weighted summations, or by beam-steering the individual traces from each air gun firing. Of course, the limiting case would be to not create arrays, that is, to process the traces from the individual air gun firings. This would provide the best spatial resolution but might allow more noise in the traces that would be otherwise reduced by forming arrays.

Since in this embodiment the shot point interval is now a post-acquisition processing parameter rather than an acquisition-set value, optimal shot point intervals may be chosen for various purposes. That is, conventionally the shot point interval is a pre-acquisition design decision that controls the collection of seismic data in the field, whereas in this embodiment the shot point interval can be specified for processing purposes post-acquisition which means that parameter may be chosen to be different values depending, as an example, on the subsurface target that is to be imaged. While typically two processing flows would be used to create seismic images from continuous Popcorn acquisition, one flow for high-resolution shallow images and one flow for deep depth images, it may be imagined that a time-variant processing flow could be used to simultaneously obtain a shallow high-resolution image while also creating images using large arrays to better image the deep section.

This use of Popcorn shooting allows considerable flexibility in creating arrays and controlling resolution and pre-stack noise.

This embodiment frees the desired and ideal array length from the physical dimensions of the array. In an embodiment, if the Popcorn method is used, then each gun is fired separately in a pattern of N seconds and is separated from the signals from overlapping guns by the Popcorn or other inversion/separation method. Thus, in this embodiment each individual gun acts as a point source, regardless of the spatial arrangement of the guns behind the seismic vessel.

The instant approach is configurable in a variety of different ways. Common to each variation, though, is that the individual source activations that overlap will need to be numerically separated. Among the methods that might be used are inversion and, in some embodiments, sparse inversion as those terms are known and used in the seismic processing arts. Among the approaches that might be employed in various embodiments are:

1. The signal from each seismic source in the array can be processed individually to increase spatial sampling density. This approach provides a great deal of flexibility since once the individual guns have been separated, digital array forming may be used to create any desired array, or, in some embodiments, the sources may be maintained as point sources.

2. Each gun can be activated in the same location as a forward gun was activated then later reconstituted as a point and summed source. That is, in this approach it will be possible to make all of the guns in the array fire at the same location by scheduling the firing times to do so. The leading gun in the array/subarray (i.e., the source closest to the towing vessel) can be fired at a particular location and then subsequent sources can be fired as they are towed to that same location. Alternatively, a similar result may be obtained by modifying the firing times slightly so that an array that is shorter than the actual physical array may be constructed. Separation of the overlapping shots can then be done using inversion or a similar technique.

3. A physically short array can be digitally lengthened if the guns on the array are shot back to front. That is, this variation allows a short array to be lengthened by scheduling the firing times of the individual guns to be spread out over a distance that is longer than the physical array. Typically this would involve firing the guns from the back of the physical array to the front, but the length of the constructed array may be more strongly affected by the firing times than the actual location of the air gun on the physical array.

The method discussed in previous paragraphs addresses the in-line shot point interval size. The use of Popcorn shooting may also improve the sampling in other directions. Air guns may be distributed along the cross-line direction and shot with Popcorn patterns. The resulting seismic signals may then be processed to appear as a single shot that has been taken with a large cross-line array or as separate shots with different cross-line positions. Intermediate cross-line samplings may also be formed.

A certain amount of care must be taken in the design of the Popcorn patterns to ensure that the sampling in the in-line or in the cross-line directions allow for effective reconstruction of shots in those directions. For example, the best reconstruction of the shots for a particular sampling will ensure that most of the shots being constructed will have physical shots contributing to them, and the distribution of these shots might best be somewhat uniform over the constructed shots. If one shot spacing is expected, the Popcorn patterns may be designed to provide the best separation of the shots at that spacing.

Figure 1:
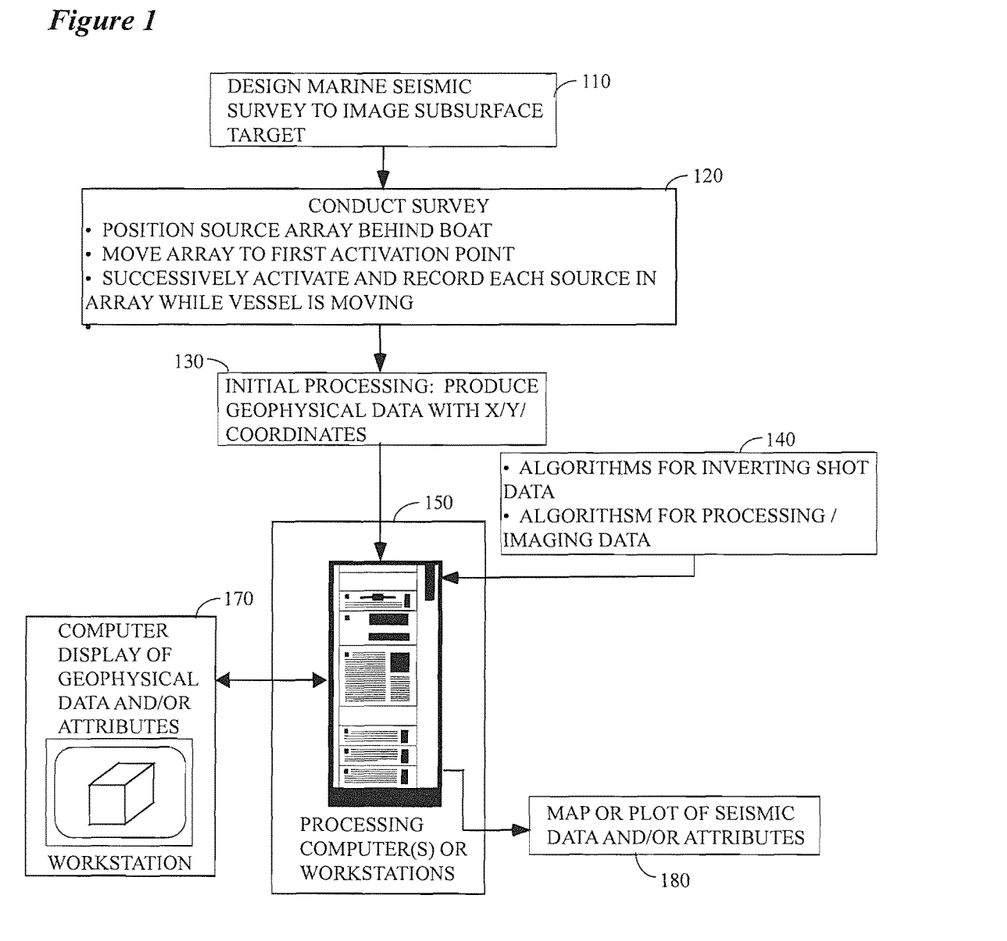
FIG. 1 illustrates a general processing environment.

Turning now to FIG. 1, this figure contains a general overview of an embodiment and its associated environment. As is indicated, generally speaking a marine seismic survey will be designed 100 in a way that anticipates the use of the teachings presented herein during acquisition. That means, as a specific example, an array (or some number of subarrays) will be selected together with two or more seismic sources that are to be towed behind the source boat. Those of ordinary skill in the art will understand how such is done and especially how such is done where the object is to image a particular subsurface target.

In the field, seismic data will be collected according to an embodiment (block 120). As is taught herein, individual sources within the array will be activated and recorded pursuant to the survey design 100 while the vessel is in motion. It is anticipated that the vast majority of source activations will over lap (or be overlapped by) one or more activations. In some instances, the receivers will be sensors that are towed behind the source or another vessel. In other cases, the receivers might include ocean bottom receivers instead of (or in addition to) the towed geophone streamers.

Next, and as is conventionally done, some initial processing will be performed to associate each seismic recording with a surface or other location (block 130). This might be done in the field or in the processing center. In either case, a computer system 150, which might be a workstation, a server, a main frame, a parallel computer, a networked collection of computers or workstations, etc.

Next, the individual source activations will be identified and separated according to methods well known to those of ordinary skill in the art (e.g., via sparse inversion). Algorithms that do such a separation will typically be made available to a computer that is to utilize them via access to some amount of local or remote hard disk or other storage (item 140). Additional algorithms useful in the processing of seismic data will be similarly provided to the CPU 150 which might be any conventional or unconventional programmable computing device.

Following identification and separation of the different seismic source recordings, the data will be processed as has been generally discussed above depending on the survey design. In some instances the now-separated source activations might be combined in different ways to produce the same effect as a simultaneous excitation of the array, combined to focus the array to emphasize reflectivity from a particular target (e.g., via beam steering). The resulting data records will be seismic records that are comparable to those conventionally recorded by other methods.

Conventional usage of the separated and possibly recombined shot records might be used in any number of ways. Conventionally, the seismic data will be processed and viewed on a computer display such as that of a workstation 170. Output from the seismic processing may be used to create maps or plots of seismic data and/or seismic attributes 180 according to methods well known to those of ordinary skill in the art.

Figure 2:
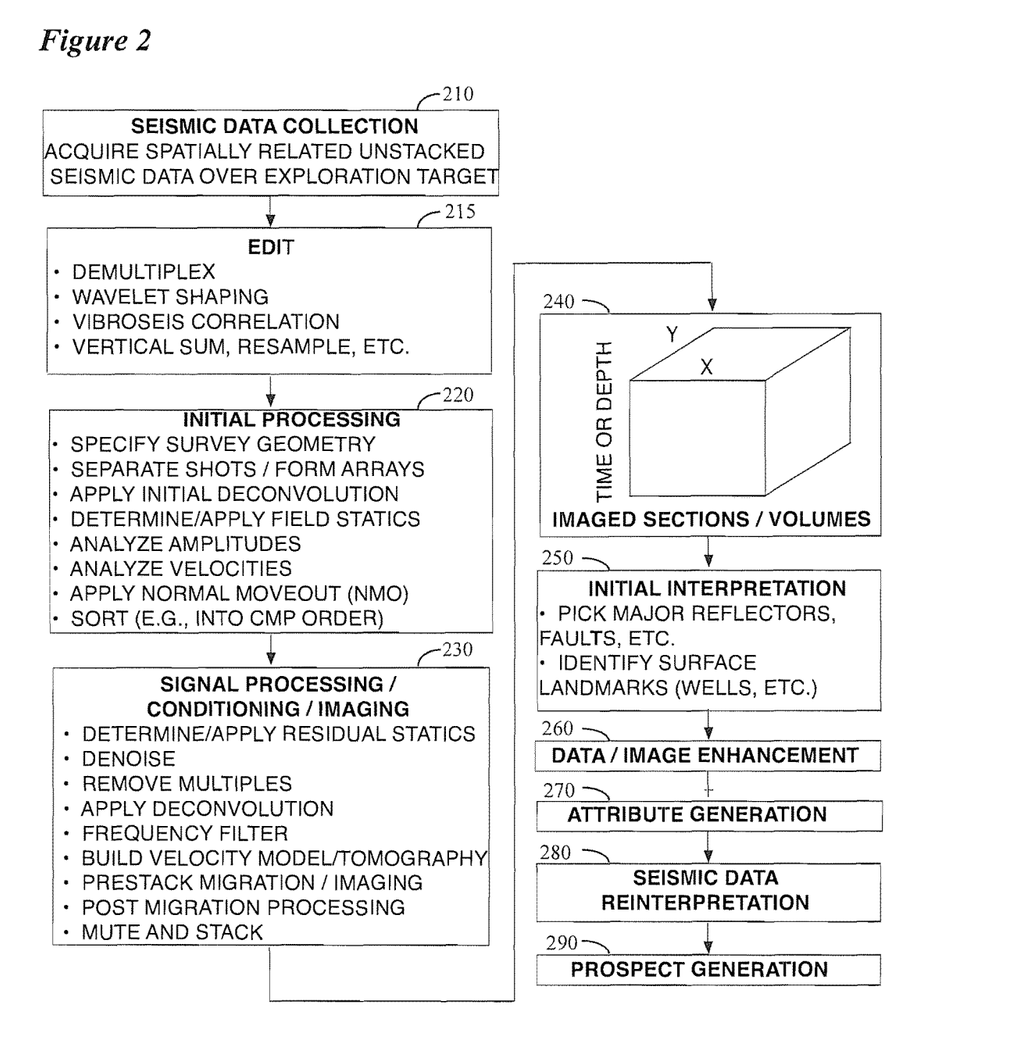
FIG. 2 contains an operating logic suitable for use with an embodiment.

FIG. 2 contains additional details of a typical seismic processing sequence that might begin with data collection according to an embodiment 210, editing 215, some sort of initial processing 220, conditioning of the signal and imaging 230, production of imaged sections or volumes 240, initial interpretation of the seismic data 250, further image enhancement consistent with the exploration objectives 260, generation of attributes from the processed seismic data 270, reinterpretation of the seismic data as needed 280, and ultimately generation of a drilling prospect 290.

Figure 3:
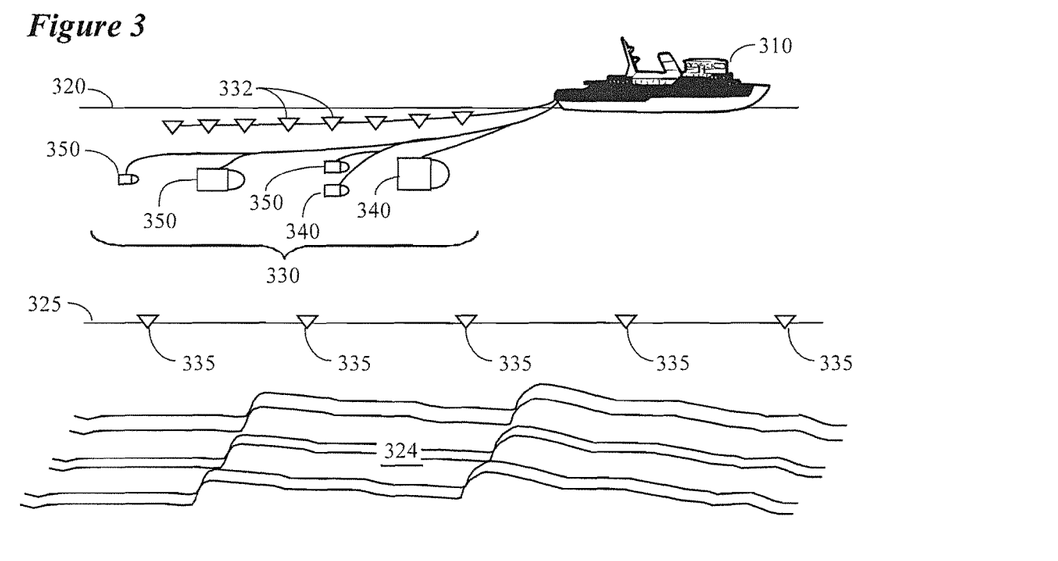
FIG. 3 illustrates an example marine environment of an embodiment.

FIG. 3 contains another illustration of an embodiment as it might be practiced. In an embodiment, one or more seismic vessels 310 will tow some number of receiver sensors 332 in a body of water 320. Additionally, at least one of the vessels 310 will tow an array 330 of seismic sources 340 and 350. Note that the sources 340/350 in the array 330 need not be the same size/capacity/frequency range and could possibly be towed at different depths. On the other hand, the sources 340/350 in the array could all be of the same size/capacity/frequency range and the fact that different sizes of icons were used should not be construed to limit the instant teachings to only those arrays with sources of different sizes. In some embodiments, additional receivers 335 (e.g., ocean bottom receivers) will be situated on the ocean floor 325. A principal object, of course, is to obtain an image of the subsurface configuration 324.

Figure 4:
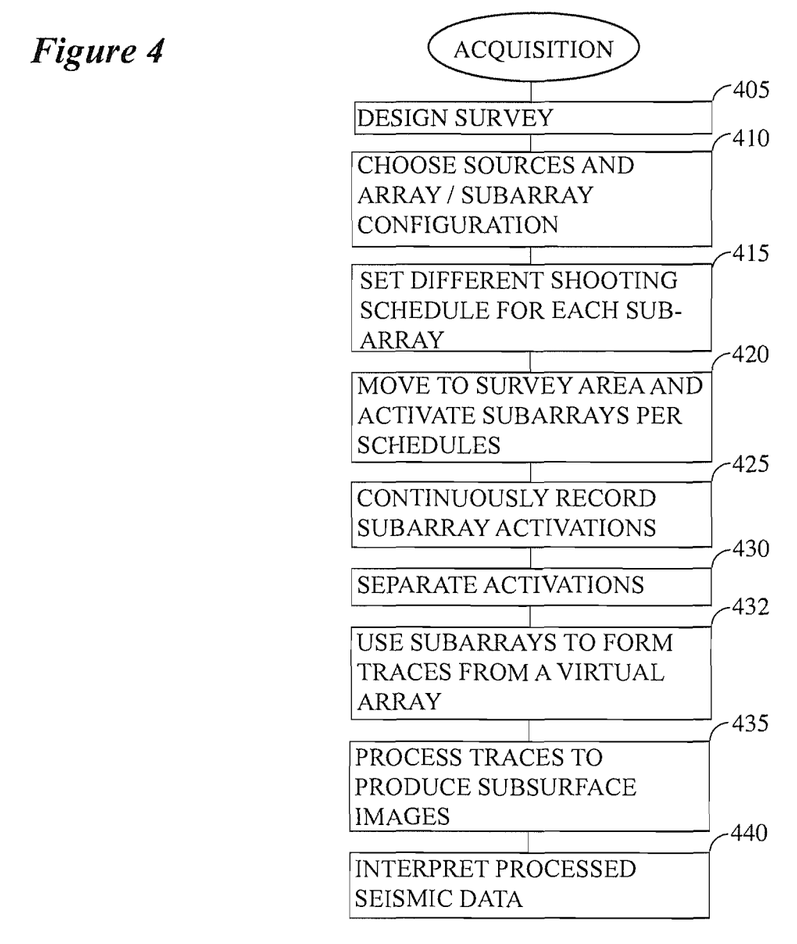
FIG. 4 contains an operating logic suitable for use with an embodiment.

FIG. 4 contains a sample operating logic suitable for use with an embodiment. As an initial matter a marine survey will be designed 405. Typically, this will be with the object of imaging a particular subsurface feature or region. In connection with such design, will be the specification of the sources that are to comprise the array that is towed over the survey area (block 410). Additionally, and in some embodiments this will be done during the design of the survey, the sources in the array will be subdivided into two or more subarrays. In some embodiments each source will be assigned to only one subarray. In other instances, one or more sources could be assigned to more than one subarray. The sources might be different sizes and have different frequency characteristics, etc. They might also be towed at the same depth or at different depths. It is critical that at least two different sources (which might or might not have similar properties) be in the array and that the array be divided into at least two different subarrays. Sources that might be appropriate would include some combination of air guns, water guns, sparkers, boomers, chip systems, water sirens, marine vibroseis, non-impulsive marine sources, etc.

In addition to the selection of the seismic array and/or in conjunction with such selection, will be the specification of how the array is to be divided into subarrays. In some embodiments some of the subarrays might consist of a single seismic source. In other embodiments, some subarrays might comprise two or more sources.

Next, a firing schedule will be developed for use with each of the subarrays (block 415). Each firing schedule will apply to each of the one or more sources in each subarray and at least two of such schedules must be different. That is, As an example, in FIG. 3 each of the individual sources 340 and 350 in the array might get its own firing schedule, independent of the others. As another example, the sources of FIG. 3 might be grouped into two subarrays and only two firing schedules would then need to be developed: one for sources 340 and another for sources 350. Those of ordinary skill in the art will readily be able to devise different combinations of sources, subarrays, and firing schedules that would be consistent with the instant disclosure.

The reconstruction of signals from Popcorn acquisition will depend on the air gun patterns used to acquire a Popcorn-type survey. Poorly designed patterns reduce the accuracy of the reconstructions, while well designed patterns improve it. By way of example, a first way of designing a Popcorn-type survey utilizes a Monte-Carlo approach where many random patterns are generated and then checked against a set of criteria to get the best patterns. Another example method would be to design the patterns analytically. Various aspects of approaches for designing firing schedules may be found in co-pending U.S. patent application Ser. No. 13/315,947, and, 61/903,587, the disclosures of which are incorporated by reference herein as if fully set out at this point.

Returning now to FIG. 4, next, one or more seismic boats will be dispatched to the survey area and the survey will begin (block 420). In addition to the source boat, additional boats might be present to tow streamers with seismic sensors. For example, it is known to have additional streamer boats if a wide azimuth survey is desired. Additionally, and as is generally indicated in FIG. 3, in some cases ocean bottom receivers might be used in conjunction with or instead of marine seismic streamers.

Next, a continuous or intermittent recording will be initiated and each source (or source group) will be activated according to its predetermined schedule (block 425). That being said, continuous recording would generally be favored, although not required. It is anticipated that generally the source activation schedules will cause the signals sourced from different firing schedules to overlap. As such, it is further anticipated that the source activations will need to be separated thereafter using, for example, sparse inversion according to methods well known to those of ordinary skill in the art.

In one embodiment after acquisition, each seismic data record will contain multiple source activations that will need to be separated or otherwise processed as a prerequisite to further seismic processing. For purposes of the instant disclosure, the term "reconstruction" should be understood to mean the processing step(s) necessary to convert traces collected during a Popcorn survey of the sort taught herein into more conventional seismic traces.

In one embodiment the recorded seismic data "d" (which might be, for example, a common offset or common receiver gather) can be related to the desired unblended/reconstructed source activations "m" through the following matrix equation:

$$d=Am,$$

where m is, broadly speaking, representative of the seismic data that would have been obtained from a more conventional seismic survey without simultaneous sourcing or Popcorn-type shooting, and where, "A" is a matrix that describes the convolution of the various Popcorn signatures onto m, where a "Popcorn signature" is the composite signature that is formed when the sources in a set are activated according to a specified firing schedule. In other words, each row of A can be thought of as a time-shifted composite source signature. In some embodiments, a coherency condition ("C") might also be applied (e.g., the shot at one surface location will tend to resemble the shots at proximate locations, etc.):

$$d=ACm.$$

Since the matrix A is likely to be underdetermined, in some embodiments an iterative approach could be used to obtain d. One method of solving for d would be as follows;

Set $m=0$;

Set $d_{estimated}=0$

Calculation Loop:

$$\Delta d = d - d_{estimated}$$

$$\Delta m = A^{-1} \Delta d$$

$$m = m + \Delta m,$$

apply coherency filter to m $$d_{estimated} = Am$$

Recalculate Δd, etc. until the answer is satisfactory. As is indicated above, in an embodiment an FK transform, FX deconvolution, Radon transform, etc., might be used as a coherency filter to attenuate incoherent energy. In some applications, the transform might be applied to a common offset or common receiver gather by taking the FK transform and discarding (e.g., setting to zero) all values below a particular threshold value. Those of ordinary skill in the art will understand that the particular parameter values that control the coherency filter might need to be selected based on experience and/or on a trial and error basis, but selection of same is well within the skill of one who practices in this field. The selection of the coherency processing parameters might depend on quality of the recorded seismic data, the Popcorn patterns utilized, the array size, sources used, etc.

Continuous Popcorn allows the shot spacing to be a processing parameter, but continuous Popcorn may also involve a significant element of simultaneous shooting and subsequent separation of the overlapping source activations (block 430). That being said, in many embodiments self-simultaneous shooting will not be desired and, in such case, the data will not need to be separated and reconstruction can proceed as is discussed supra.

Next, the now-separated source activations will be further processed as has been described previously (block 435) to produce subsurface images.

Finally, the seismic sections, attribute analyses, etc., will be available for use in prospect generation, subsurface interpretation, etc. (block 440).

Figure 5:
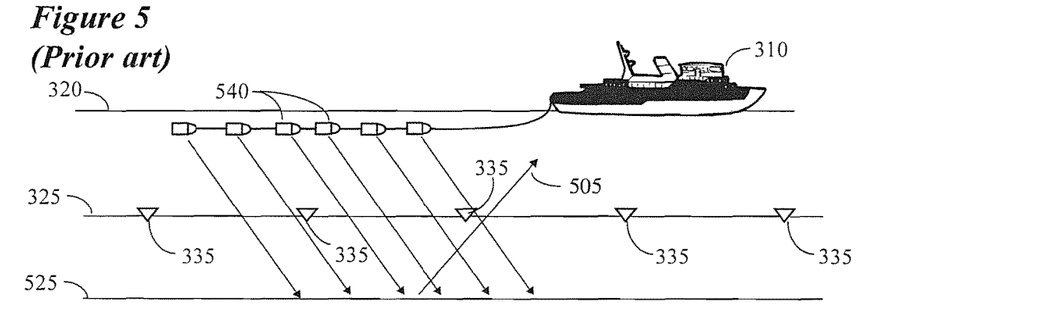
FIG. 5 illustrates a prior art approach to source activations using an array of marine seismic sources.

Turning next to FIG. 5, this figure illustrates a conventional approach to using a source array in a marine setting. In this case, each of the sources 540 in the array will be activated simultaneously which will result in a single recorded activation (represented schematically by the up going ray 505). Because all of the sources 540 are activated simultaneously the six reflecting points associated with the six source activations are smeared and treated as if the acoustic energy had been emitted from the geometric center of the array (i.e., between guns 3 and 4 which is schematically represented by the origin of the up going ray 505). This lateral smearing, of course, introduces certain inaccuracies into the subsurface image that is collected by the conventional method. It should be noted and remembered that the sources 540 might all be the same size, frequency content, etc., or they might be differ in size, frequency content, etc. depending on the needs of the particular survey.

Figure 6:
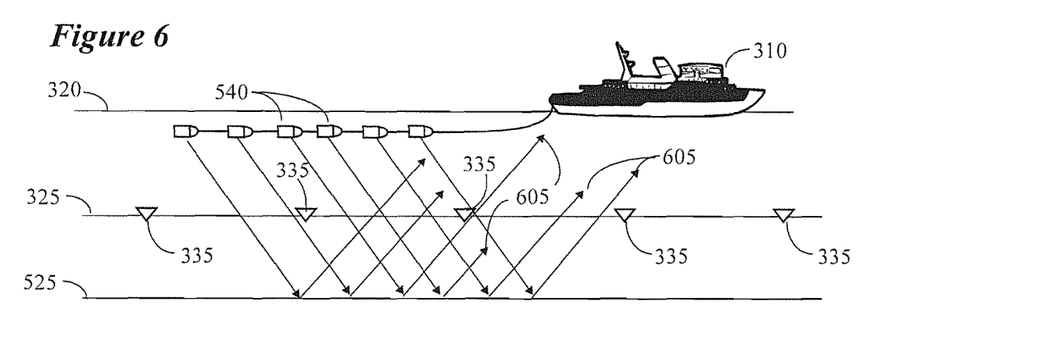
FIG. 6 illustrates an advantage of an embodiment.

On the other hand, if the six guns 540 are fired separately and not simultaneously (FIG. 6), the six guns can be reconstituted as a single shot comparable to the arrangement of FIG. 5, or reconstituted as six separate shots, thereby increasing the spatial sampling by a factor of six. In this case, each of the guns will generate its own up going wave field 605 which can be extracted, separately processed and combined (or not) with other source activations from this array. In an alternative arrangement, some of the guns, say the first three could be formed into one group and the last three into another, with the sources in each group being activated simultaneously. This would produce two different "sources" that could then be combined and/or processed separately.

Figure 7A:
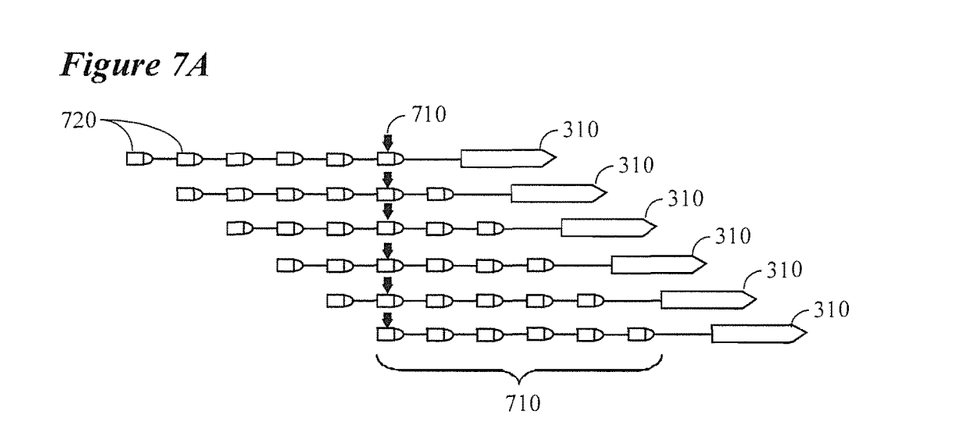
FIGS. 7A and 7B illustrates an embodiment wherein individual sources in an array are sequentially activated (7A) and subarrays are activated (7B) at the same location on the surface of the earth.

Note that the previous observation means that popcorn shots from individual guns could be used to reconstruct a signal comparable to the one that would have been obtained if every source in the array had been activated at the same point on the subsurface. In the arrangement of FIG. 7A, and as an example a vessel 320 is pictured as towing a 6 gun 720 array 710. Note that although the graphic icons used to represent the guns in the array 710 are all the same size, that should not be used to infer that, in practice, the guns would all be the same size, towed at the same depth, have the same frequency content or other properties. Instead, it should be understood and remembered that the guns 710 might be any size, towed at any depth, etc.

Figure 7B:
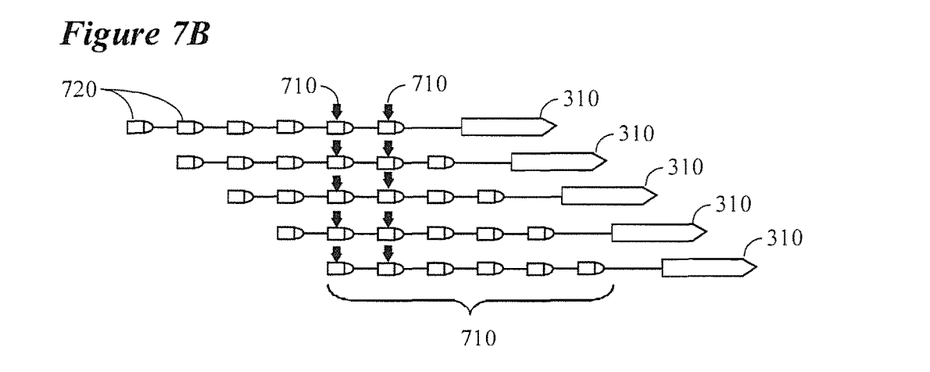

In this figure, the same vessel 310 is shown at intervals of 1 second as it moves through the water toward the right hand side of the figure. In this embodiment, each individual source 720 is activated in turn at the same location as it is pulled over that location. The source that is activated is indicated by the arrow 710. Thus, in this figure if the vessel 310 is sailing at 4.86 knots (2.5 m/s) and the inline spacing of the guns 720 is 2.5 m, and the guns are separately shot at 1 second intervals beginning with the forward gun (i.e., the gun closest the towing vessel 310), followed by the second gun, and so on, each of the 6 guns 720 will fired proximate to the same location on the surface of the earth. If the 6 guns' shots are thereafter reconstituted and summed as a single shot, the effective array length is zero, despite the fact that the physical array length in this example is 12.5 m. Similarly, in FIG. 7B subarrays (pairs of sources 710 are sequentially activated such that each source pair is fired at the same location. As might be expected, in both FIGS. 7A and 7B the recorded subsurface reflections from the shots will overlap in time and need to be separated before being further processed to image the subsurface.

Figure 8:
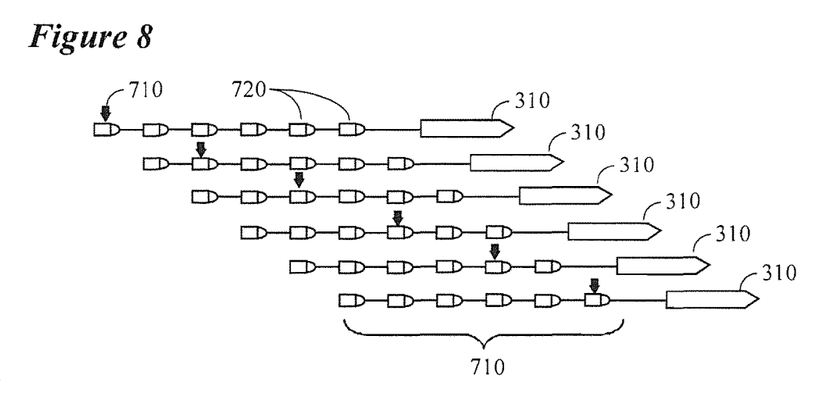
FIG. 8 contains a schematic that illustrates how an effective array length may be created that is longer than the actual array length.

On the other hand and turning next to the example of FIG. 8, this figure illustrates how the same towed array 710 can be used according to create an effectively stretched source. That is, as an example a virtual source array can be created that is longer than the actual array. In this example, a vessel 310 is towing a 6 gun 720 array 710. As before, the vessel 310 of FIG. 8 is shown at intervals of 1 second as the array 710 is towed through the water. If the vessel is sailing at 4.86 knots (2.5 m/s) and the inline spacing of the guns is 2.5 m, and the guns 720 are activated at 1 second intervals beginning with the gun most distant from the vessel, followed by the gun second most distant, etc., when the 6 guns' shots are reconstituted and summed together as a single shot, the effective array length will be 25 m, rather than the physical array length of 12.5 m.

Figure 9:
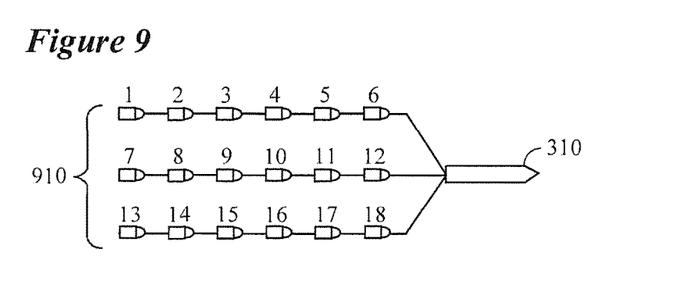
FIG. 9 illustrates an array with three subarrays that can be utilized according to an embodiment.

Turning next to the example of FIG. 9, in this case the vessel 310 is towing an 18-gun array 910 which consists of three subarrays of six guns each. In a conventional survey, all 18 of the guns would be fired simultaneously and processed as a single seismic shot which would be then be considered to have been located roughly at the geometrical center of the array. That being said, in some cases the location of the shot might be determined based on the energy or pressure, etc. But, in any case, the shot when this array 910 is simultaneously activated will be considered to have taken place at a position that is a compromise value based on the number and positions of the guns in the array/subarray.

According to an embodiment, most or all of the guns are not fired simultaneously, but sequentially in patterns that meet various numerical and geophysical criteria. For example, a popcorn pattern may require the guns to be discharged in the order: 2, 9, 16, 1, 10, 14, 6, 8, 12, 17, 7, 16, 4, 11, 15, 13, 5, 3. A pattern may be constructed so that a given gun might be used more than once in a pattern, or not at all although, typically, each gun would be used once each time the pattern was employed. In the popcorn method, the seismic data recorded from the discharged guns can be reconstructed to a single point, such as the geometrical center. Or the seismic data from each individual gun can be positioned at the location of that gun when it was discharged. Or the seismic data from a group or subgroup of guns can be reconstituted, or treated, as a single shot. For example, guns 1-6 could be treated as a single shot; similarly guns 7-12 and 13-18, or guns 1, 7, 13 could be grouped, followed temporally by a group composed of 2, 8, 14, followed temporally be 3, 9, 15, and so on. Or 6, 12, 18 could be followed by 5, 11, 17, etc. Guns can be shot in the location of a previously discharged gun, or not. The patterns can be designed so that the sequence provides an acoustic beam steer in a given azimuth. Therefore, the methods disclosed herein provide great flexibility in choosing the resulting source array lengths and distance between shots (spatial sampling).

Figure 10:
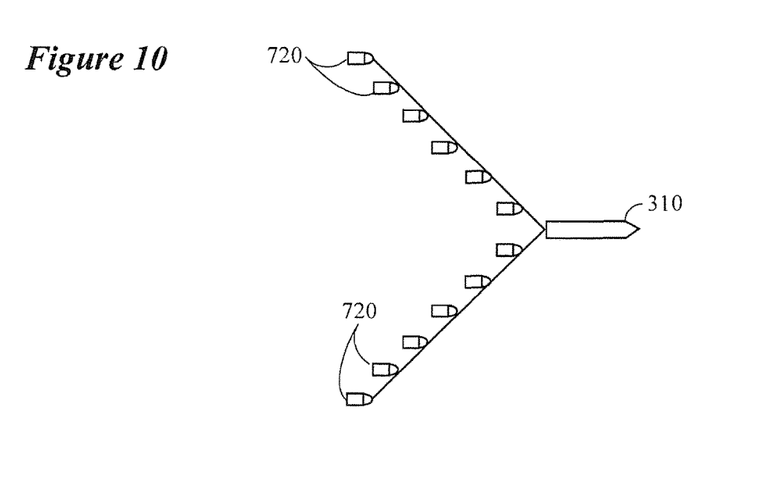
FIG. 10 contains an illustration of a boat/source configuration that can be used to create an enhanced cross-line spatial sampling.

Finally, turning next to FIG. 10, this embodiment contains an example of how crossline spatial sampling might be implemented. In this case, the airguns 720 might be spread by means of paravanes (or other means) according to methods well know to those of ordinary skill in the art. Each airgun, when repeatedly discharged, will generate a number of CMP (i.e., common mid-point) lines equal to the number of seismic receiver lines. Since each CMP line will be separated by half the distance between the guns, the number of CMP lines generated will be 17× greater (in this example) than if all the guns were discharged simultaneously and conventionally. Or the data could be reconstituted as a single shot with a large areal extent.

Additional details related to the simultaneous source and self-simultaneous source methods may be found in one or more of the following references, the disclosures of which are incorporated herein by reference in their entirety and for all purposes as if fully set out at this point: U.S. patent application Ser. No. 12/542,433, U.S. Patent Application Ser. No. 61/154,613; Separation Of Simultaneous Seismic Sources By Non-Linear Inversion/Abandoned USSN), and U.S. patent application Ser. No. 13/315,925; Distance-And Frequency-Separated Swept-Frequency Seismic Sources).

Further, where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Still further, when in this document a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

It should be noted that in the foregoing, the discussion has been largely couched in terms of conventional marine seismic surveys, but that was done for purposes of illustration only and not out of an intent to limit the disclosure presented herein to only those sorts of surveys. Those of ordinary skill in the art will understand how the embodiments presented supra could readily be applied, by way of example only, to 2D, 3D, 4D, etc., marine surveys, down hole surveys, VSPs, or any combination of same.

Although the instant disclosure might have described the seismic sources as "guns", "airguns", etc., that was done only for purpose of illustration and any marine source including, without limitation, air guns, water guns, sparkers, boomers, chirp systems, water sirens, etc., might potentially be used. Additionally, as noted previously aspects of the instant disclosure could be applied on land as well. Further, instances where the term "shot" was used herein should not be construed to limit the instant disclosure to only operating with impulsive sources. Thus, when the term "seismic survey" is used herein that term should be understood to apply to a survey on water, land, or any combination of same unless specifically indicated otherwise.

While this invention is susceptible of embodiment in many different forms, there is shown in the drawings, and is herein described in detail, some specific embodiments. It should be understood, however, that the present disclosure is to be considered an exemplification of the principles of the invention and is not intended to limit it to the specific embodiments or algorithms so described. Those of ordinary skill in the art will be able to make various changes and further modifications, apart from those shown or suggested herein, without departing from the spirit of the inventive concept, the scope of which is to be determined by the following claims.

What is claimed is:

1. A method of seismic exploration above a region of the subsurface of the earth containing structural or stratigraphic features conducive to the presence, migration, or accumulation of hydrocarbons, wherein is provided a seismic array towed proximate to the region of the subsurface of the earth, said seismic array comprising a plurality of marine seismic sources organized into a plurality of subarrays, each of said subarrays having one or more of said marine seismic sources associated therewith, the method comprising:
   (a) providing a different shooting schedule for each of said plurality of subarrays;
   (b) recording seismic data as each of said plurality of subarrays is activated according to said provided shooting schedule;
   (c) choosing a shot point interval as a post-acquisition processing parameter, wherein the shot point interval is utilized to generate a post-acquisition shot point array approximately a length of the shot point interval, wherein the shot point array corresponds to the marine seismic sources activated during the chosen shot point interval;
   (d) identifying any seismic traces within said recorded seismic data corresponding to said chosen shot point interval;
   (e) reconstructing said any identified seismic traces into a plurality of seismic data traces by solving a system of equations represented by $d=Am,$ where m is said plurality of seismic data traces, d is said any identified seismic traces, and A, is a set of Popcorn signatures corresponding to said shooting schedule; and,
   (f) using said plurality of seismic data traces to image at least a portion of the subsurface of the earth.

2. The method of claim 1, wherein at least one of said plurality of subarrays comprises a single one of said plurality of marine seismic sources.

3. The method of claim 1, wherein said each of said marine seismic sources is selected from the group consisting of an air gun, a water gun, a sparker, a boomer, a chip system, and a water siren.

4. A method of seismic exploration above a region of the subsurface of the earth containing structural or stratigraphic features conducive to the presence, migration, or accumulation of hydrocarbons, wherein is provided a marine seismic array towed proximate to the region of the subsurface of the earth, said marine seismic array comprising a plurality of marine seismic sources organized into two or more subarrays, each of said subarrays having one or more of said marine seismic sources associated therewith, the method comprising:
   (a) towing said marine seismic array to a location proximate to the region of the subsurface of the earth;
   (b) determining a distance of each of said subarrays to said marine craft;
   (c) while said marine craft is moving, sequentially activating each of said subarrays in turn according to its said determined distance from said marine craft beginning with a most distant one of said plurality of subarrays;
   (d) recording seismic data while said each of said subarrays is activated;
   (e) reconstructing a plurality of seismic traces from said recorded seismic data by separating individual activations of each of said subarrays and creating post-acquisition arrays from the individual activations as a post-acquisition processing parameter; and,
   (f) using said plurality of seismic traces to image at least a portion of the subsurface of the earth.

5. The method of claim 4, wherein at least one of said plurality of subarrays comprises a single one of said plurality of marine seismic sources.

6. The method according to claim 4, wherein said each of said marine seismic sources is selected from the group consisting of an air gun, a water gun, a sparker, a boomer, a chip system, and a water siren.

7. The method of claim 4, wherein step (e) is performed by solving:

$d=Am,$ where m is said plurality of seismic traces, d is said recorded seismic data, and A, is a set of Popcorn signatures.

8. The method of claim 4, wherein step (e) is performed by solving:

$$d=ACm.$$

where m is said plurality of seismic traces, d is said recorded seismic data, A, is a set of Popcorn signature, and C is a matrix of coherency conditions.

9. The method of claim 4, wherein creating post-acquisition arrays from the individual activations is performed utilizing simple summations, weighted summations, or by beam-steering the individual activations.

10. A method of seismic exploration above a region of the subsurface of the earth containing structural or stratigraphic features conducive to the presence, migration, or accumulation of hydrocarbons, wherein is provided a marine seismic array towed proximate to the region of the subsurface of the earth, said marine seismic array comprising a plurality of marine seismic sources organized into two or more subarrays, each of said subarrays having one or more of said marine seismic sources associated therewith, the method comprising:
   (a) positioning said marine seismic array so that a first one of said plurality of subarrays is proximate to a location above the region of the earth;
   (b) activating said first one of said plurality of subarrays proximate to said location;
   (c) after said first one of said plurality of subarrays is activated, towing said marine seismic array until a second one of said plurality of subarrays is proximate to said location;
   (d) activating said second one of said plurality of subarrays proximate to said location;
   (e) performing steps (c) and (d) for at least two different ones of said plurality of subarrays;
   (f) recording seismic data sourced from activation of said first one of said plurality of subarrays and from activation of any of said second ones of said plurality of subarrays activated proximate to said location;
   (g) reconstructing a plurality of seismic traces from said recorded seismic data by separating individual activations of each of said plurality of subarrays and creating post-acquisition arrays from the individual activations as a post-acquisition processing parameter; and,
   (h) using said plurality of seismic traces to image at least a portion of the subsurface of the earth.

11. The method according to claim 10, wherein at least one of said plurality of subarrays comprises a single one of said plurality of marine seismic sources.

12. The method of claim 10, wherein said each of said marine seismic sources is selected from the group consisting of an air gun, a water gun, a sparker, a boomer, a chip system, and a water siren.

13. The method of claim 10, wherein step (g) is performed by solving:

$$d=Am,$$

where m is said plurality of seismic traces, d is said recorded seismic data, and A, is a set of Popcorn signatures.

14. The method of claim 10, wherein step (g) is performed by solving:

$$d=ACm.$$

where m is said plurality of seismic traces, d is said recorded seismic data, A, is a set of Popcorn signature, and C is a matrix of coherency conditions.

15. A method of seismic exploration for hydrocarbons within a region of the subsurface of the earth, the method comprising:
   (a) accessing a plurality of reconstructed seismic traces from a seismic survey collected proximate to the region of the subsurface of the earth according to an acquisition method comprising:
      (1) towing said marine seismic array to a location proximate to the region of the subsurface of the earth;
      (2) determining a distance of each of said subarrays to said marine craft;
      (3) while said marine craft is moving, sequentially activating each of said subarrays in turn according to its said determined distance from said marine craft beginning with a most distant one of said plurality of subarrays;
      (4) recording seismic data while said each of said subarrays is activated; and,
      (5) reconstructing a plurality of seismic traces from said recorded seismic data by separating individual activations of each of said subarrays and creating post-acquisition arrays from the individual activations as a post-acquisition processing parameter; and,
   (b) using said plurality of reconstructed seismic traces to image at least a portion of the subsurface of the earth, thereby exploring for hydrocarbons within the region of the subsurface of the earth.

16. A seismic exploration system comprising:
   a seismic array towed proximate to the region of the subsurface of the earth, said seismic array comprising a plurality of marine seismic sources organized into a plurality of subarrays, each of said subarrays having one or more of said marine seismic sources associated therewith;
   a first computing system configured to provide a different shooting schedule for each of said plurality of subarrays;
   a plurality of receivers configured to record seismic data as each of said plurality of subarrays is activated according to said provided shooting schedule;
   a second computing system configured to:
      identify any seismic traces within said recorded seismic data corresponding to a chosen shot point interval, wherein the chosen shot point interval comprises a post-acquisition processing parameter and is utilized to generate a post-acquisition shot point array approximately a length of the shot point interval, wherein the post-acquisition shot point array corresponds to marine seismic sources of the plurality of marine seismic sources activated during the chosen shot point interval;
      reconstruct said any identified seismic traces into a plurality of seismic data traces by solving a system of equations represented by $$d=Am,$$

where m is said plurality of seismic data traces, d is said any identified seismic traces, and A, is a set of Popcorn signatures corresponding to said shooting schedule; and,
      image at least a portion of the subsurface of the earth using said plurality of seismic data traces.

17. The seismic exploration system of claim 16, wherein at least one of said plurality of subarrays comprises a single one of said plurality of marine seismic sources.

18. The seismic exploration system of claim 16, wherein said each of said marine seismic sources is selected from the group consisting of an air gun, a water gun, a sparker, a boomer, a chip system, and a water siren.

* * * * *